United States Patent [19]

Lenac

[11] Patent Number: 4,551,248

[45] Date of Patent: Nov. 5, 1985

[54] FILTER DRUM FOR ROTARY DRUM VACUUM FILTER

[75] Inventor: Nevio Lenac, Bridgeport, Conn.

[73] Assignee: Dorr-Oliver Incorporated, Stamford, Conn.

[21] Appl. No.: 500,640

[22] Filed: Jun. 3, 1983

[51] Int. Cl.$^4$ ............................................. B01D 33/06
[52] U.S. Cl. ..................................... 210/404; 210/406
[58] Field of Search ............... 210/402, 404, 406, 161, 210/174, 210-215, 217, 326; 162/251, 264

[56] References Cited

U.S. PATENT DOCUMENTS

| | | | |
|---|---|---|---|
| 1,748,081 | 2/1930 | Reed | 210/402 |
| 2,510,254 | 6/1950 | Richter | 210/402 |
| 2,537,414 | 1/1951 | Lindblad | 210/404 |
| 3,027,011 | 3/1962 | Flynn | 210/404 |
| 3,125,514 | 3/1964 | Frykhult | 210/404 |
| 3,327,863 | 6/1967 | Turner | 210/404 |
| 3,452,874 | 7/1969 | Keller | 210/404 |
| 3,455,454 | 7/1969 | Sheaffer | 210/404 |
| 3,517,818 | 6/1970 | Luthi | 210/404 |
| 4,383,877 | 5/1983 | LaValley | 210/404 |

Primary Examiner—Ernest G. Therkorn
Attorney, Agent, or Firm—B. J. Kearns; R. L. Sahr

[57] ABSTRACT

A drum structure for a rotary drum vacuum filter wherein the drum comprises a pair of conical shaped support members having concentrically arranged interconnected peripheral base portions with the apexes of the support members carried by spaced cylindrical end plates which form the end walls of the drum. Filtrate compartments are formed beneath the outer filtration surface of the drum by adjacent pairs of a plurality of spaced panels having edge portions fixed to both the support members and the end plates.

1 Claim, 5 Drawing Figures

FILTER DRUM FOR ROTARY DRUM VACUUM FILTER

BACKGROUND OF THE INVENTION

The present invention is directed to new and useful improvements in filters and in particular to rotary drum vacuum filters.

Rotary drum vacuum filters are well known and utilize filtration members which comprise a cylindrical drum mounted for rotation in a tank containing a slurry solution. Filter media is provided about the outer surface of the drum and a vacuum is applied to the surface of the drum during a period of the filtration cycle as the drum is rotated through the slurry to draw filtrate into filtration compartments within the drum while forming a filter cake on the surface of the filter media. A suitable valve assembly is provided to interrupt the vacuum during a final period of the filtration cycle after the cake bearing portion is clear of the tank and the cake dried. The filter cake is then removed from the filter media by suitable doctoring means. Supply of the vacuum is controlled by the valve assembly which is usually located concentrically with the center of the drum at end trunnions and through which valve assembly the filtrate is conducted outwardly of the filter.

In conventional filters of this type various structures have been utilized for providing the main drum portion of the filter. In general these known structures comprise relatively complex arrangements which require excessive internal filtrate piping systems and drum supporting structures which results in increased cost both in labor and material in assembly and operation of the filter.

It is an object of the present invention to provide an improved drum construction for a rotary drum vacuum filter.

Another object is to provide a novel drum construction which includes means for rapid flow of the filtrate from the filtrate compartment.

It is a further object to provide a drum structure comprised of a minimum number of parts which reduces manufacturing costs and assembly procedures.

SUMMARY OF THE INVENTION

The present invention contemplates a novel drum structure for a rotary drum vacuum filter. In the disclosed embodiment the drum comprises a pair of main conical shaped support sections connected at their bases to each other and at opposite apex ends to cylindrical end plates of the drum. Filtration grids are interconnected to the spaced peripheral portions of the end plates to provide the outer surface of the filter drum and filtration compartments are formed by triangular shaped fin-like plate members secured to the outer wall surfaces of the control supports.

The above and other objects and advantages of the present invention will appear more fully hereinafter from a consideration of the detailed description which follows taken together with the accompanying drawings wherein one embodiment of the invention is illustrated.

DETAILED DESCRIPTION

Figure 1:
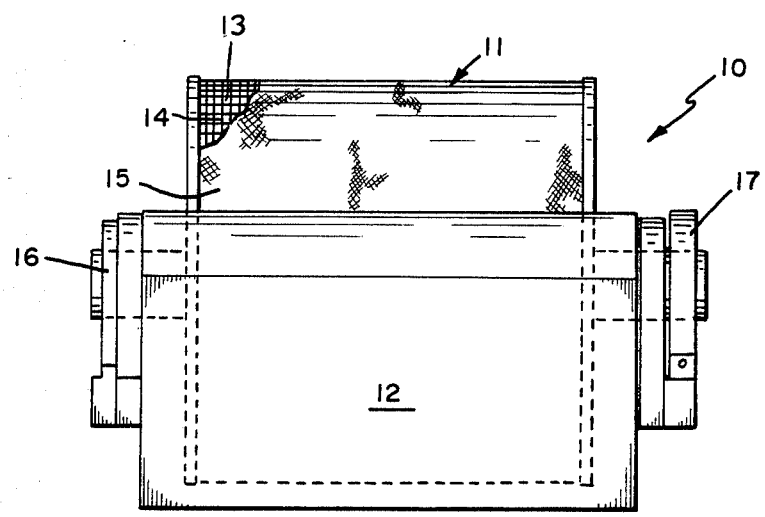
FIG. 1 is a front elevational view of a rotary drum vacuum filter embodying the present invention.
Figure 2:
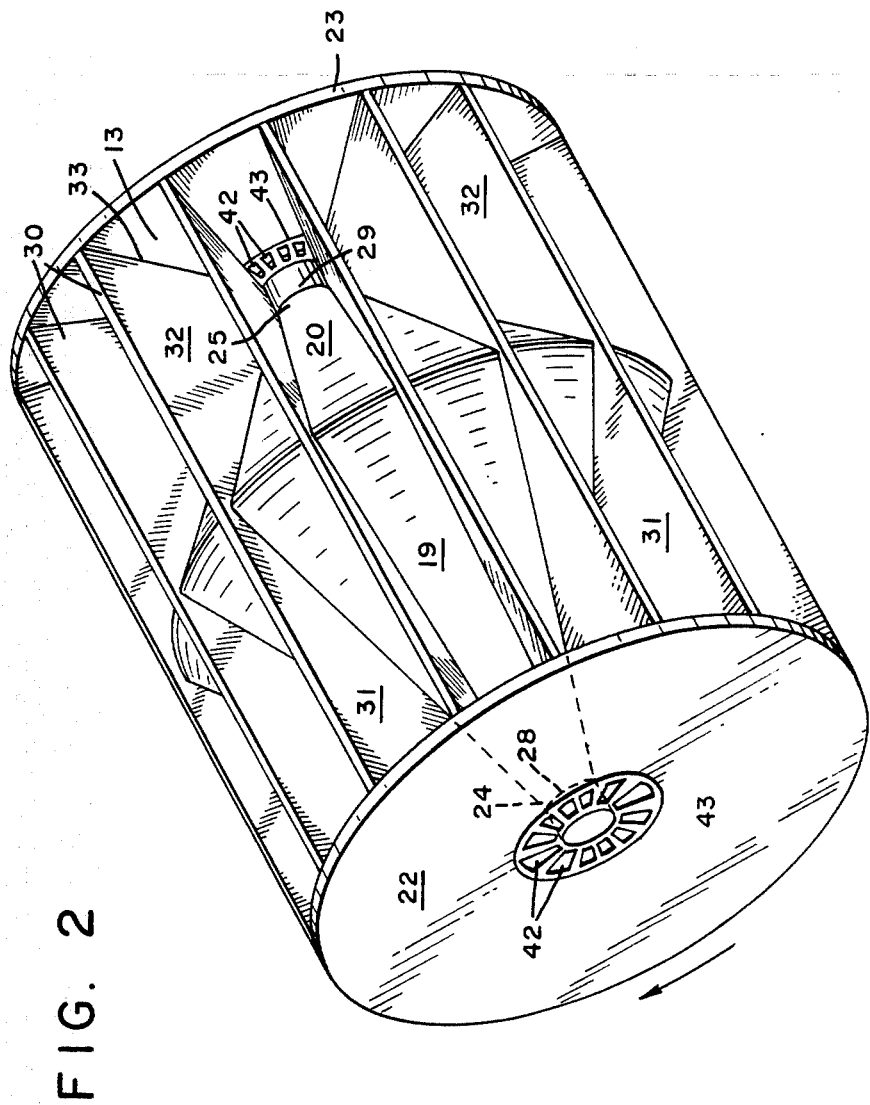
FIG. 2 is a perspective view of the main portions of the drum assembly with the filtration grids removed therefrom.

Referring now to the drawings for a more detailed description of the present invention a rotary drum vacuum filter incorporating an embodiment thereof is generally indicated by the reference numeral 10 in FIG. 1. Filter 10 comprises a cylindrical drum 11 adapted for rotation in a well known manner in a tank 12 containing a slurry solution. Drum 10 includes internal filtrate compartments 13 located beneath filtration grids 14. A filter media 15 such as a filter cloth is secured to the outer surface of the drum 11.

Figure 4:
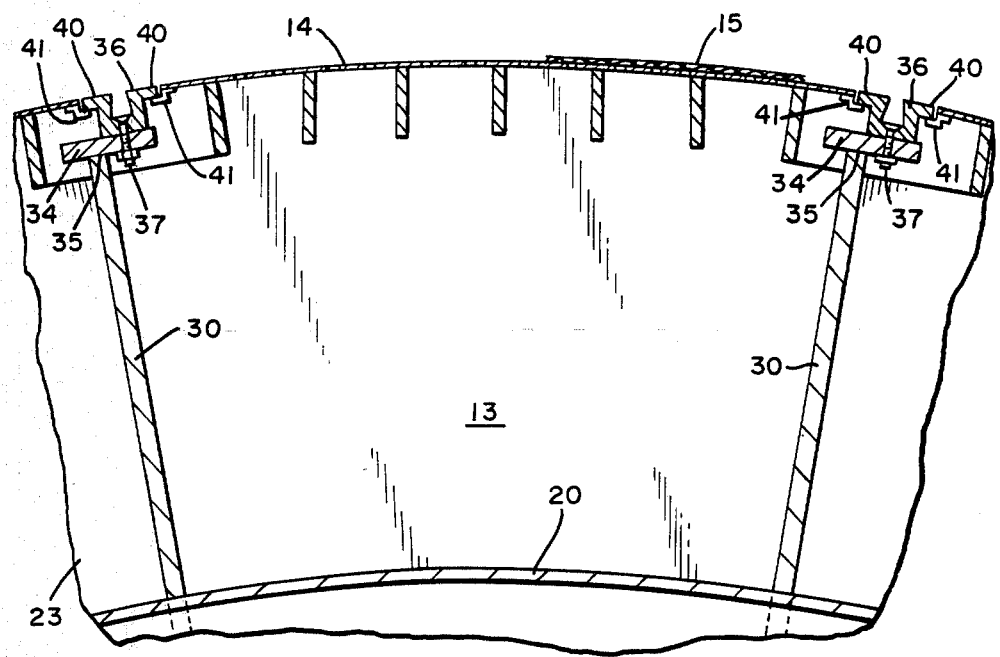
FIG. 4 is a sectional view taken on the line 4—4 of FIG. 3.
Figure 5:
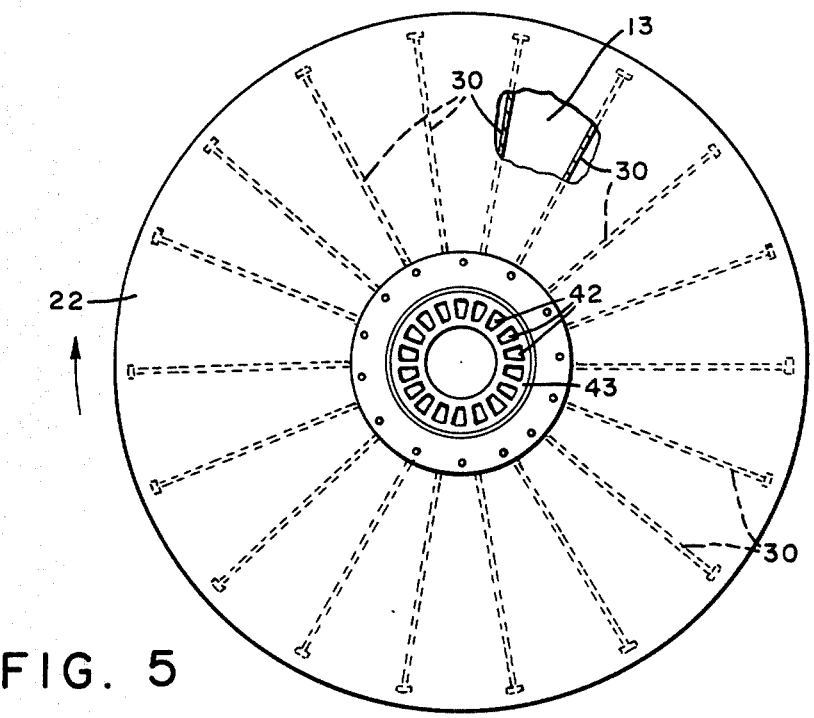
FIG. 5 is an end view of the drum as seen in FIG. 2.

In use of filter 10 a liquid pulp slurry is fed to tank 12. As drum 11 rotates in the direction of arrow A (FIG. 4) a vacuum is applied to the filtrate compartments 13 through spaced valve assemblies 16 and 17 (FIG. 1) to cause a suction whereby filter cake adheres to the surface of filter media 15 as it rotates through the slurry. Filtrate is drawn by the vacuum from the filtrate drainage compartments 13 outwardly of filter 10 through valve assemblies 16-17 which function to selectively interrupt the vacuum at a point in the rotation cycle prior to drum 10 rotating past a suitable doctoring device which removes the filter cake from the surface of filter media 15 for discharge. A valve assembly as hereinbefore referred to is generally well known in the art as for example disclosed in U.S. Pat. No. 3,455,454.

It is to be understood that the structure thus far described refers to conventional structure as found in known rotary drum vacuum filters and that the present invention which is to be hereinafter described in further detail is not limited to the particular filter shown. The drawings having been simplified to show only conventional parts of filter 10 as being necessary for a clear understanding of the present invention.

As mentioned it is an object of the present invention to provide a simplified drum structure for filter 10. To this end drum 10 includes two large conical shaped support sections 19 and 20 which are welded to each other at their corresponding abutting peripheral bottoms. The end walls of drum 10 comprise spaced cylindrical end plates 22 and 23 which are connected to the apexes 24–25 respectively of conical supports 19 and 20 by shafts 26 and 27 which have end portions 28–29 sealed welded thereto. Shafts 26 and 27 are contained within housings 26a and 27b which are connected at one end to the outer surface of end plates 22–23 and the opposite ends to valve assemblies (in a manner not shown).

A plurality of filtrate drainage compartments 13 in drum 11 are formed between pairs of adjacent panel members 30. Each panel 30 comprising triangular shaped sections 31 and 32 having lower edges sealingly affixed to the outer surface of conical supports 19 and 20 with opposite side edge portion 33 welded to an adjacent end plate 22 or 23. Elongated grid support strips 31 are spot welded to the upper straight edge surface of each plate 30 and extend across the outer periphery of drum 10. U-shaped clamps 36 are attached to support strips 34 by bolts 37.

Figure 3:
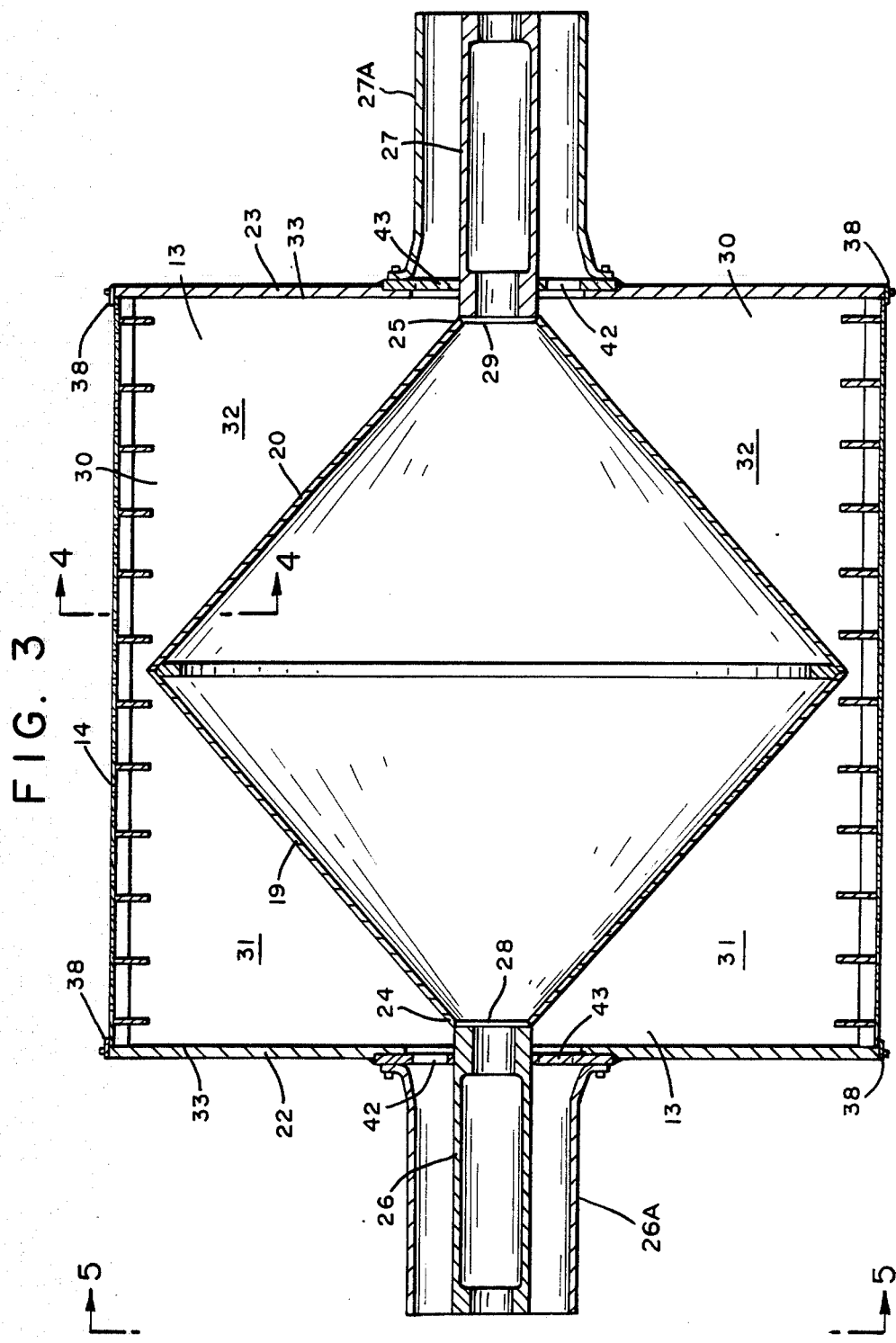
FIG. 3 is a cross-sectional view of the filter drum removed from the filter.

Rectangular shaped filtration grid sectors 14 have opposite ends secured to end plates 22-23 by tabs 38 (FIG. 3) and are secured to support strips 31 by clamp arms 40 of clamp 36 which engage flanges 41 on the longitudinal edge portions of sectors 14. In this manner the outer surface of drum 10 is completed with a filtrate compartment 13 formed between each adjacent pair of plates 30 beneath sectors 14.

In operation of filter 10 during the applied vacuum portion of the filtration cycle filter cake will adhere to the outer surface of filter media 15. Concurrently filtrate will enter filtrate drainage compartments 13 and follow the downwardly sloped outer surface of support 18 or 19 toward apex 24 or 25 for exit therefrom through openings 42 in a circular plate 43 one of which is positioned in each end plate 23-24 at the center thereof. The filtrate is then conducted through trunnion housing 26A and 27B to valve assembly 16 or 17 in a usual manner.

As will be readily appreciated the novel drum structure has many advantages in use. In addition to utilizing a minimum number of parts filtrate piping is eliminated from the filtrate compartments to the valve outlet providing for improved filtrate control and flow rates.

It is to be expressly understood that the present invention is not limited to the embodiment illustrated and described. Various changes can be made in the design and arrangement of parts without departing from the spirit and scope of the invention, as the same will now be understood by those skilled in the art.

What is claimed is:

1. A rotary drum vacuum filter having a drum mounted for rotation in a slurry tank through a filtration cycle wherein filter cake is formed on the outer surface of the drum by applied vacuum and filtrate is passed through said drum for discharge through filtrate drainage compartments within said drum to a discharge valve assembly, said drum comprising:

(a) a pair of conical shaped support members having concentrically arranged interconnected peripheral base portions, (b) a pair of spaced cylindrical end plates havng spaced trunnion housings attached to the outer walls thereof, (c) shaft means in said trunnion housings concentric with said conical shaped support members and interconnecting said end plates to the apex portions of said conical support members, (d) a plurality of filtrate outlets provided in said end plates about said shaft means, (e) a plurality of spaced and parallel triangular shaped divider panels extending longitudinally of and attached to the outer surface of said conical support members in radial relationship thereon, (f) a plurality of rectangular shaped filtration grid sectors each having transverse end portions connected to said opposite end plates and longitudinal side portions connected to a pair of said adjacent divider panels to provide a plurality of said filtrate drainage compartments about the periphery of said drum of said panels, (g) said divider panels configured to conform to the shape of said conical support member to provide sloped floors to said filtrate drainage compartments within said filter discharge outlets located at the lower end of said sloped floors adjacent the apexes of said support member, and (h) filtrate discharge openings provided in said end plates at said trunnion housings in communication with said filtrate drainage compartments.

* * * * *